July 7, 1931.  E. E. FREEMAN  1,813,732
FURNACE CONTROL
Filed Jan. 16, 1931
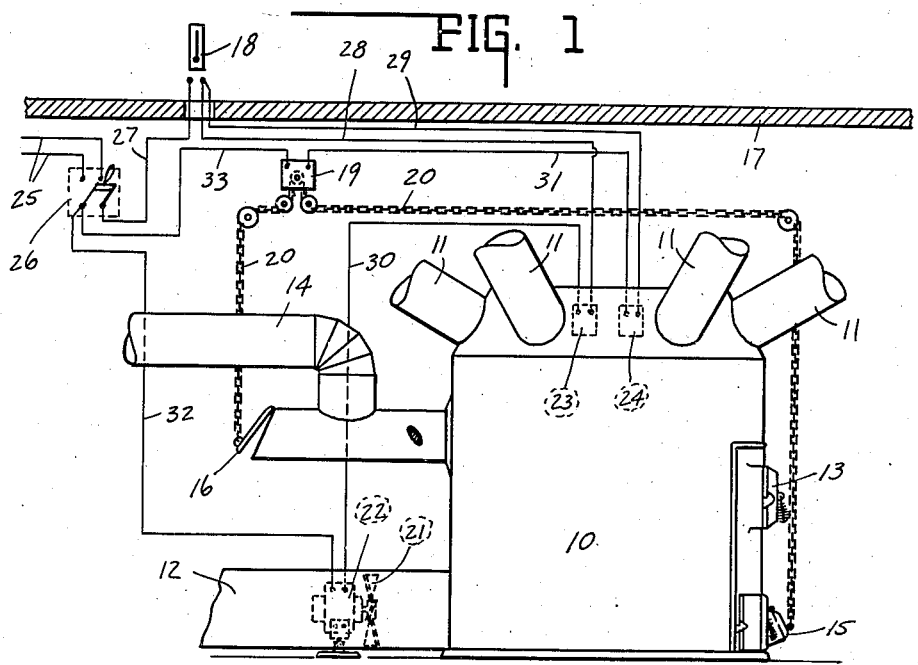
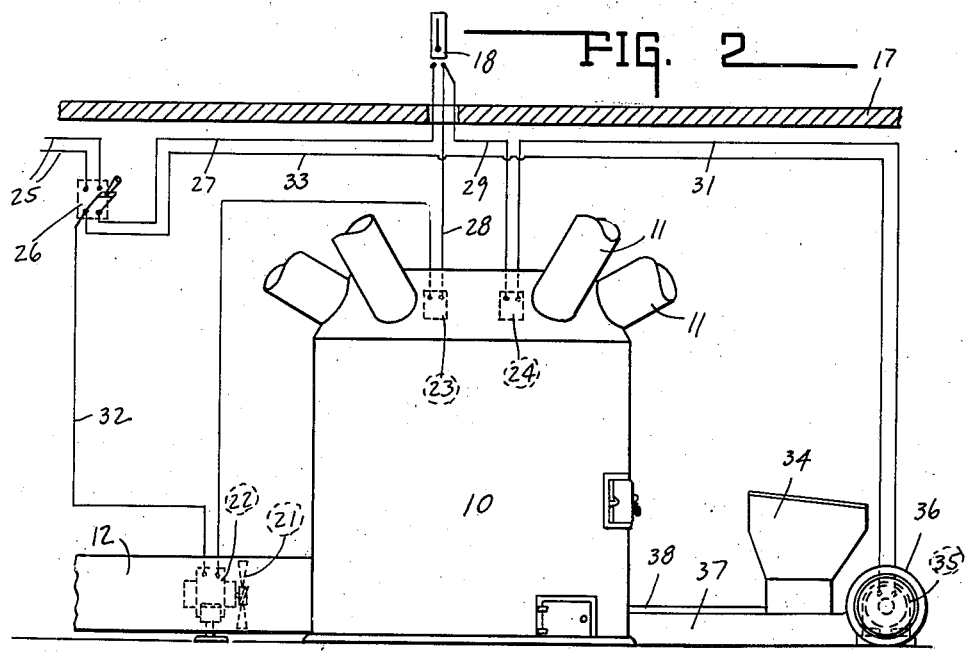
INVENTOR.
EDWARD E. FREEMAN.
BY
Lockwood Lockwood Goldsmith & Galt
ATTORNEYS.

Patented July 7, 1931

1,813,732

UNITED STATES PATENT OFFICE

EDWARD E. FREEMAN, OF DANVILLE, ILLINOIS

FURNACE CONTROL

Application filed January 16, 1931. Serial No. 509,049.

This invention relates to control apparatus, principally for use with a hot air furnace.

The principal object of the invention is to provide a control for the rate of combustion and for the operation of an accelerating device, such as a fan, blower or similar apparatus, used for accelerating the rate of supply of the heat-conducting medium, such as air, to be heated by the furnace, said control being such as to permit the operation of said accelerating device and to check combustion in case the furnace becomes overheated and such as to interrupt the operation of said accelerating device while increasing the rate of combustion if the furnace has not been heated above a predetermined temperature.

In addition, a control feature is added by means of which both the combustion and the supply of the heat-conducting medium are checked when the temperature of the room or object to be heated is above a predetermined degree.

Other objects and features of the invention will be apparent from the accompanying drawings and the following description and claims:

Figure 1 is an elevational view partly diagrammatic showing the application of the invention to a hand-fired, hot air furnace.

Figure 2 is a similar view showing the invention applied to a stoker-fired furnace.

In Figure 1 a furnace 10 is fitted with the usual hot air pipes 11, cold air inlet 12, fire door 13, smoke pipe 14 and draft dampers 15 and 16. The floor of a room to be heated is indicated by the numeral 17 and a thermostat 18 is located within the said room. An electrically-operated damper controller 19 of a common commercial form is connected by means of chains 20 with the dampers 15 and 16 and is adapted to accelerate the combustion by moving the said chains to open damper 15 and close damper 16 when electric current is supplied to said controller. When no current is supplied, the controller operates to check combustion by moving the chains in the opposite direction. A fan 21 and motor 22 are associated with the cold air inlet 12 to accelerate the supply of cold air to the furnace. A pair of thermostatic switches 23 and 24 are located within the hood of the furnace. Suitable electric power for the operation of the damper controller 19 and the fan motor 22 is supplied by means of power mains 25 connected to a knife switch 26. One terminal of the said knife switch is connected by means of a wire 27 to the thermostat 18. The opposite terminal of the thermostat is connected by a pair of wires 28 and 29 to the thermostatic switches 23 and 24 respectively. The opposite terminal of switch 23 is connected by a wire 30 with one terminal of the fan motor 22. The opposite terminal of the switch 24 is connected by a wire 31 with the damper controller 19. The opposite terminals of the fan motor 22 and damper controller 19 are connected to the second terminal of the knife switch by wires 32 and 33 respectively.

In the operation of the apparatus, the fan motor 22 is operated when the following electric circuit is completed: 25, 26, 27, 18, 28, 23, 30, 22, 32, 26, 25. The damper controller 19 is actuated to accelerate combustion when the following circuit is completed: 25, 26, 27, 18, 29, 24, 31, 19, 33, 26 and 25. When this circuit is broken, the damper controller is adapted to move the dampers to check the fire. Since the thermostat 18 is included in both these circuits and since the said thermostat is of the type to open its circuit when the room temperature is above a predetermined value, it is evident that the fan 21 will be stopped and the damper control will operate to check the fire whenever this predetermined room temperature is exceeded.

The switch 23 is of a type which closes its circuit only when a predetermined temperature is exceeded. This temperature is so chosen that the circuit within the switch 23 is only completed when the furnace hood has been heated to a temperature greater than normal room temperature. Thus the fan 21 will not be operated if the furnace has not reached a temperature at which the air would be heated above room temperature. In other words, the fan 21 can never operate to force unheated air into the rooms to be heated while this control is in operation.

For summer use, however, where the fan 21 is to be used for ventilating, suitable electric circuits are provided for short circuiting the switch 23 to permit operation of the fan 21 regardless of the furnace temperature.

The switch 24 is of the type which opens its circuit when a predetermined temperature has been exceeded. This temperature is so chosen that the circuit within the switch is opened when the furnace has been heated to such a point that further heating might prove dangerous. When the circuit is so opened, the damper control operates to check the fire independently of the temperature of the thermostat 18 while the fan motor 22 continues under the control of said thermostat. The fan motor, therefore, continues to operate even though the furnace is overheated so long as the room temperature is not above the degree for which the thermostat 18 is set. The fan 21 thus serves to assist in the cooling of the furnace when the fire has been checked because of overheating.

In Figure 2, the invention is shown applied to a stoker-fired furnace. In the said figure reference numerals refer to parts having similar construction and function to like numbered parts in Figure 1. In addition, there is shown a stoker hopper 34, a stoker motor 35 and fan 36. The fan is driven by the motor 35 and supplies air to the furnace for combustion through a conduit 37. Fuel is supplied from the hopper 34 through a conduit 38 containing suitable conveying apparatus also driven by motor 35. The supply of air and of fuel are, therefore, both accomplished by the operation of the motor 35. Thus combustion within the furnace is accelerated when the motor 35 is operated, and is checked when the motor 35 is stopped. The motor 35 is connected in the wiring in a position corresponding to that of the damper controller 19 and the control of combustion therefor is accomplished in exactly the same manner as with the hand-fired furnace.

By similarly applying the above-described apparatus to the fuel supply system of an oil or gas-fired furnace, the same may be controlled in exactly the same manner. Other variations in the details of the invention are possible without departing from the broader features thereof. For example, the wiring shown herein is the so-called "two wire system". With several commercial types of damper controllers and thermostats, a "three wire system" is used. Such controllers and thermostats may be used as a part of the apparatus for carrying out the invention and the same may be connected by wiring analogous to that shown herein. In another form of the invention, the fan 21 may be so placed as to draw the heated air from the furnace instead of forcing cold air thereto. In either case the rate of cold air supply is controlled by the operation of the fan.

The invention claimed is:

1. In a furnace control, the combination of apparatus for controlling the rate of combustion and the rate of supply of a heat-conducting medium, thermostatic apparatus responsive to furnace temperature, and connections between said control apparatus and said thermostatic apparatus by means of which said control apparatus operates to check combustion while supplying said medium when furnace temperature exceeds a predetermined degree.

2. In a furnace control, the combination of apparatus for controlling the rate of combustion and the rate of supply of a heat-conducting medium, thermostatic apparatus responsive to furnace temperature, and connections between said control apparatus and said thermostatic apparatus by means of which said control apparatus operates to accelerate combustion and check the supply of said medium when furnace temperature is below a predetermined degree.

3. In a furnace control, the combination of apparatus for controlling the rate of combustion and the rate of supply of a heat-conducting medium, thermostatic apparatus responsive to furnace temperature, and connections between said control apparatus and said thermostatic apparatus by means of which said control apparatus operates to check combustion while supplying said medium when furnace temperature exceeds a predetermined degree and to accelerate combustion and check the supply of said medium when furnace temperature is below a second predetermined degree lower than said first.

4. In a furnace control, the combination of apparatus for controlling the rate of combustion and the rate of supply of a heat-conducting medium, thermostatic apparatus responsive to furnace temperature, connections between said control apparatus and said thermostatic apparatus by means of which said control apparatus operates to check combustion while supplying said medium when furnace temperature exceeds a predetermined degree, other thermostatic apparatus responsive to the temperature of the object to be heated, and connections between said control apparatus and said last-mentioned thermostatic apparatus by means of which said control apparatus operates to check both combustion and the supply of said medium when said object is above a predetermined temperature irrespective of the furnace temperature.

5. In a furnace control, the combination of apparatus for controlling the rate of combustion and the rate of supply of a heat-conducting medium, thermostatic apparatus responsive to furnace temperature, connections between said control apparatus and said thermostatic apparatus by means of which said control apparatus operates to accelerate combustion and check the supply of said medium when furnace temperature is below a predetermined degree, other thermostatic apparatus responsive to the temperature of the object to be heated, and connections between said control apparatus and said last-mentioned thermostatic apparatus by means of which said control apparatus operates to check both combustion and the supply of said medium when said object is above a predetermined temperature irrespective of the furnace temperature.

6. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, and thermostatic apparatus interposed in said circuits, responsive to furnace temperature and adapted to interrupt the circuit to said combustion control apparatus while completing the circuit to the motor of said fan when furnace temperature is above a predetermined degree.

7. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, and thermostatic apparatus interposed in said circuits, responsive to furnace temperature and adapted to interrupt the circuit to the motor of said fan while completing the circuit to said combustion control apparatus when furnace temperature is below a predetermined degree.

8. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, and thermostatic apparatus interposed in said circuits, responsive to furnace temperature and adapted to interrupt the circuit to said combustion control apparatus while completing the circuit to the motor of said fan when furnace temperature is above a predetermined degree, and to interrupt the circuit to the motor of said fan while completing the circuit to said combustion control apparatus when furnace temperature is below a second predetermined degree lower than said first.

9. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, thermostatic apparatus interposed in said circuits, responsive to furnace temperature and adapted to interrupt the circuit to said combustion control apparatus while completing the circuit to the motor of said fan when furnace temperature is above a predetermined degree, and other thermostatic apparatus interposed in said circuits in series connection with said first-mentioned thermostatic apparatus, responsive to the temperature of the space to be heated and adapted to interrupt the circuits to both said combustion control apparatus and to the motor of said fan when said last-mentioned temperature is above a predetermined value.

10. In a furnace control, the combination of an electrically-operated combustion control apparatus adapted to accelerate combustion when supplied with electric power and to check combustion when not so supplied, a motor-driven fan for controlling the supply of air to be heated, a source of electric power, electric circuits for connecting said power source to said control apparatus and the motor of said fan, thermostatic apparatus interposed in said circuits, responsive to furnace temperature and adapted to interrupt the circuit to the motor of said fan while completing the circuit to said combustion control apparatus when furnace temperature is below a predetermined degree, and other thermostatic apparatus interposed in said circuits in series connection with said first-mentioned thermostatic apparatus, responsive to the temperature of the space to be heated and adapted to interrupt the circuits to both said combustion control apparatus and to the motor of said fan when said last-mentioned temperature is above a predetermined value.

In witness whereof, I have hereunto affixed my signature.

EDWARD E. FREEMAN.